United States Patent [19]

Moser

[11] Patent Number: 4,987,741
[45] Date of Patent: Jan. 29, 1991

[54] SUPERCHARGED INTERNAL COMBUSTION ENGINE
[75] Inventor: Franz Moser, Steyr, Austria
[73] Assignee: Steyr-Daimler-Puch AG, Vienna, Austria
[21] Appl. No.: 402,047
[22] Filed: Sep. 1, 1989
[30] Foreign Application Priority Data Sep. 2, 1988 [AT] Austria ................................. 2159/88

[51] Int. Cl.⁵ ............................................ F02B 29/04
[52] U.S. Cl. ..................................................... 60/599
[58] Field of Search ........................... 60/599; 123/563

[56] References Cited

U.S. PATENT DOCUMENTS 1,371,444  3/1921  Sherbondy ...................... 123/563 X

FOREIGN PATENT DOCUMENTS 1003505  2/1957  Fed. Rep. of Germany ......... 60/599
28719    2/1986  Japan ..................................... 60/599
1326503  8/1973  United Kingdom .................. 60/599

Primary Examiner—Michael Koczo
Attorney, Agent, or Firm—Marmorek, Guttman & Rubenstein

[57] ABSTRACT

An internal combustion engine comprises a supercharger for supplying charge air and a charge air cooler, which is arranged near the front end of the engine and is adapted to be supplied with charge air. The charge air line extends through the charge air cooler to the air receiver and is connected by a directional valve to a branch line, which bypasses the charge air cooler. In order to achieve a space-saving and compact design, the supercharger and the directional valve are disposed near the rear end of the engine and the air receiver, which in itself constitutes the branch line, is connected at that end which is opposite to the charge air line via a tubular port or the like directly to the directional valve.

1 Claim, 1 Drawing Sheet

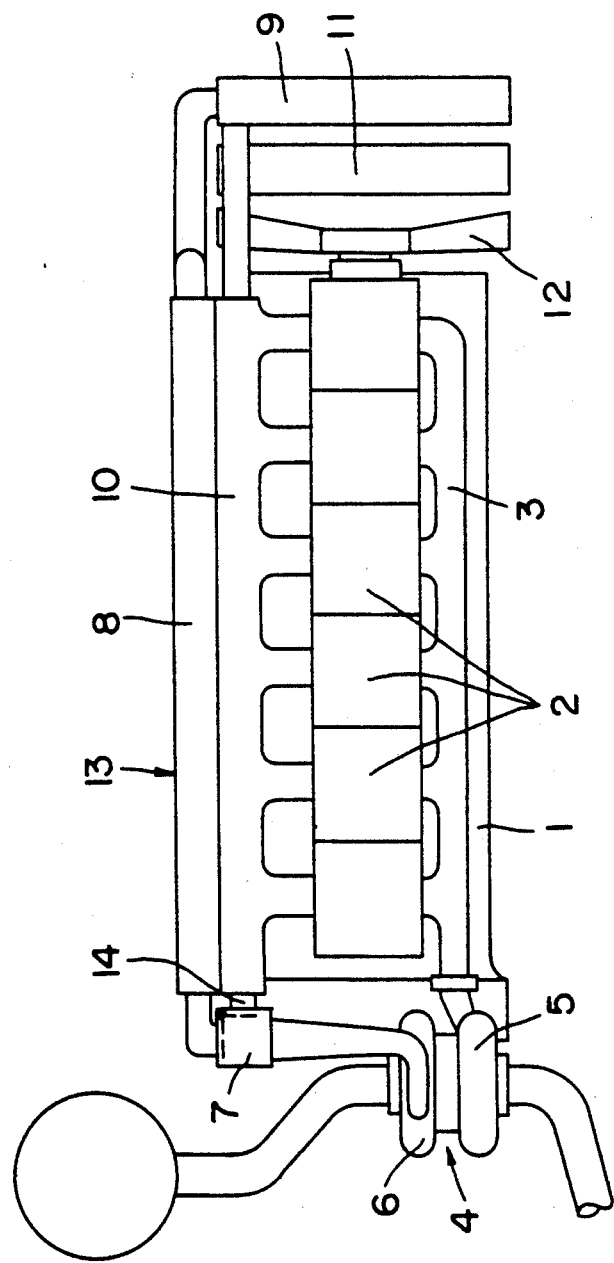

SUPERCHARGED INTERNAL COMBUSTION ENGINE

BACKGROUND OF THE INVENTION

1 Field of the Invention

This invention relates to an internal combustion engine comprising a supercharger for supplying charge air and a charge air cooler, which is provided near the front end of the engine and is adapted to receive charge air from the supercharger via a charge air line and is connected to the air receiver of the engine, wherein a directional valve is provided for selectively supplying the charge air to the air receiver via the charge air cooler or via a path which by-passes the charge air cooler.

2 Description of the Prior Art

Supercharged internal combustion engines, particularly compression-ignition engines, are often provided with a charge air cooler in which the air which has been compressed and heated in the supercharger is cooled to about 50° to 60° C. before it is supplied to the combustion chamber so that the power will be increased and the emissions will be decreased, the fuel consumption will be decreased and the life of the engine will be prolonged. But the cooling of the charge air may have disadvantages. The air that is supplied to the engine may be at an excessively low temperature. Specifically, the running of the engine may be rough, the combustion noise of the engine may be increased. The ignition conditions may be less desirable, the emission of white smoke may be increased, the ignition delay may be prolonged so that the peak pressures in the combustion chamber may be increased, and other consequences may be encountered. In order to avoid said disadvantages, by-pass lines have already been provided, which by-pass the charge air cooler, as has been disclosed in Published German Application No. 36 27 686 or EP-A2-0 080 984. By said by-pass lines the air which has been compressed and heated in the compressor can directly be supplied to the engine without being cooled. For that purpose, suitable directional valves are provided for controlling said by-pass lines in dependence on the operating conditions of the engine and/or of parameters which are influenced by ambient conditions or the like. In such arrangements, all or part of the charge air is supplied through the by-pass line and/or the charge air cooler in dependence on external and internal conditions. The charge air cooler, in most cases an air-air heat exchanger, is disposed at the front end of the internal combustion engine and the by-pass line branches from the charge air line closely before the inlet of the cooler and immediately behind the cooler opens into the charge air line which leads to the air receiver so that space-consuming conduit means and a corresponding structural expenditure are required.

SUMMARY OF THE INVENTION

For this reason it is an object of the invention to eliminate said disadvantages and to provide an internal combustion engine which is of the kind described first hereinbefore and which distinguishes by having a charge air line which has a particularly simple and space-saving design.

That object is accomplished in accordance with the invention in that the supercharger and the directional valve are provided near the rear end of the engine and the end of the air receiver which is opposite to the outlet of the charge air line is directly connected to the directional valve by a tubular port or the like.

That parallel connection of the air receiver and of the charge air line which extends to the charge air cooler eliminates the need for a separate by-pass line which by-passes the charge air cooler because it permits the use of the directional valve for short-circuiting the receiver to the charge air line. The charge air which flows into the receiver is blown into the same from mutually opposite directions and if charge air which has been cooled is blown into the receiver in front through the charge air cooler and charge air which has not been cooled is blown into the receiver from the rear, virtually directly through the compressor and the directional valve. That arrangement comprises highly compact and space-saving lines and avoids heat losses which would be suffered by the charge air if it would flow through a separate bypass line when a cooling is not desired.

If a receiver housing is provided which is divided into two longitudinal chambers, which are connected to the directional valve and one of which constitutes the air receiver proper and the other is a part of the charge air line leading to the charge air cooler, a line housing will be provided which can be made in a simple manner, e.g., by casting, and can be mounted particularly skillfully as a unit of construction.

BRIEF DESCRIPTION OF THE DRAWING

The drawing is a strictly diagrammatic top plan view showing an internal combustion engine in accordance with the invention.

DETAILED DESCRIPTION OF THE PREFERRED EMBODIMENT

An internal combustion engine 1 comprises an exhaust manifold 3, which is connected to the cylinder heads 2 and to which a supercharger 4 is flanged, which comprises an exhaust gas turbine 5 and an air compressor 6. On its discharge side, the compressor 6 is connected by a directional valve 7 to a charge air line 8, which leads via a charge air cooler 9 to the air receiver 10 of the internal combustion engine 1. The supercharger 4 and the directional valve 7 are provided at the rear end of the engine. The charge air cooler 9, the water cooler 11 and the fan 12 that is driven by the engine are provided in front of the engine so that the charge air line 8 extends substantially parallel to the air receiver 10. At that end of the air receiver which is remote from the charge air cooler 9, the air receiver 10 is connected by a tubular port 14 also to the directional valve 7. In dependence on the position of the directional valve 7 the charge air may be conducted through the charge air line 8 and the cooler 9 into the air receiver 10 so that cooled air will be supplied to the cylinder heads 2, or charge air may flow through the compressor 6 directly to the air receiver and may then enter the conbustion chamber as uncooled air.

Because the charge air line 8 and the air receiver 10 extend in parallel, the arrangement is very compact and space-saving and a common housing 13 may constitute the air receiver and the charge air conduit.

I claim:

1. An internal combustion engine for a vehicle which travels in a forward direction, said internal combustion engine having a front end oriented toward said forward direction of travel and a rear end oriented away from said forward direction of travel, said internal combustion engine comprising,
- a supercharger mounted on said rear end of said internal combustion engine for producing compressed charge air,
- a charge air cooler mounted at said front end of said engine for cooling said compressed charge air,
- an air receiver having a front end and a rear end aligned with said front end and said rear end of said internal combustion engine for delivering compressed charge air to cylinders of said internal combustion engine,
- a charge air line extending from said supercharger through said charge air cooler to said air receiver,
- bypass means for selectively supplying said charge air directly from supercharger to said air receiver on a path which bypasses said charge air cooler, said bypass means comprising a directional valve for selectively connecting said supercharger to said receiver via said charge air line extending through said charge air cooler or via said path which bypasses charge air cooler,
- said directional valve being mounted on said rear end of said engine near supercharger,
- said front end of said air receiver being connected to said charge air line and said rear end of said air receiver including a tubular port directly connected to said directional valve, and
- a receiver housing divided into first and second parallel chambers extending from said end to said rear end of said air receiver,
- said first chamber constituting said air receiver and being connected to said tubular port, and
- said second chamber constituting a part of said charge air line and being connected between said directional valve and said charge air cooler.

* * * * *